(12) United States Patent
Tunstall

(10) Patent No.: US 11,700,111 B2
(45) Date of Patent: Jul. 11, 2023

(54) PLATFORM NEUTRAL DATA ENCRYPTION STANDARD (DES) CRYPTOGRAPHIC OPERATION

(71) Applicant: Cryptography Research, Inc., San Jose, CA (US)

(72) Inventor: Michael Tunstall, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 266 days.

(21) Appl. No.: 16/909,530

(22) Filed: Jun. 23, 2020

(65) Prior Publication Data

US 2020/0412523 A1 Dec. 31, 2020

Related U.S. Application Data

(60) Provisional application No. 62/911,710, filed on Oct. 7, 2019, provisional application No. 62/867,160, filed on Jun. 26, 2019.

(51) Int. Cl.
*G06F 21/75* (2013.01)
*H04L 9/06* (2006.01)
*H04L 9/00* (2022.01)

(52) U.S. Cl.
CPC .......... *H04L 9/0625* (2013.01); *G06F 21/755* (2017.08); *H04L 9/003* (2013.01); *H04L 9/0631* (2013.01); *H04L 2209/043* (2013.01); *H04L 2209/046* (2013.01); *H04L 2209/24* (2013.01)

(58) Field of Classification Search
CPC ............................. G06F 21/755; H04L 9/003
See application file for complete search history.

(56) References Cited

U.S. PATENT DOCUMENTS

| | | | |
|---|---|---|---|
| 6,940,975 B1 * | 9/2005 | Kawamura | H04L 9/0625 380/37 |
| 7,076,059 B1 | 7/2006 | Kiszely | |
| 9,430,188 B2 | 8/2016 | Di Sirio et al. | |
| 2005/0259814 A1 * | 11/2005 | Gebotys | H04L 9/0618 380/28 |
| 2006/0177052 A1 * | 8/2006 | Hubert | H04L 9/003 380/29 |

(Continued)

*Primary Examiner* — David J Pearson
(74) *Attorney, Agent, or Firm* — Lowenstein Sandler LLP

(57) ABSTRACT

Systems and methods for protecting block cipher computation operations from external monitoring attacks. An example apparatus for implementing a block cipher may comprise a memory device to store instructions for computing a block cipher; and a processing device coupled to the memory device. The processing device performs a Data Encryption Standard (DES) cryptographic operation with multiple rounds of a Feistel structure, each round including a substitution function and a transformation function that combines an expansion function and a permutation function into a single operation. The transformation function transforms a first input portion of an internal state of the respective round and a second input portion of the internal state into a first output portion and a second output portion of data. The second output portion is equal to the first input portion and the first output portion is dependent on a combined permutation output from the transformation function.

19 Claims, 7 Drawing Sheets

(56) References Cited

U.S. PATENT DOCUMENTS

| | | | |
|---|---|---|---|
| 2011/0013767 A1* | 1/2011 | Kim | H04L 9/0618 |
| | | | 380/28 |
| 2013/0129081 A1* | 5/2013 | Guillet | H04L 9/0618 |
| | | | 380/28 |
| 2015/0244524 A1* | 8/2015 | Pulkus | H04L 9/3006 |
| | | | 380/28 |
| 2016/0330019 A1* | 11/2016 | Michiels | H04L 9/0631 |
| 2017/0324543 A1* | 11/2017 | Drexler | G06F 21/12 |
| 2019/0050601 A1 | 2/2019 | Zeh et al. | |

* cited by examiner

US 11,700,111 B2

PLATFORM NEUTRAL DATA ENCRYPTION STANDARD (DES) CRYPTOGRAPHIC OPERATION

RELATED APPLICATION

This application claims the benefit of U.S. Provisional Application No. 62/911,710, filed Oct. 7, 2019, and U.S. Provisional Application No. 62/867,160, filed Jun. 26, 2019, the entire contents of both are hereby incorporated.

TECHNICAL FIELD

The present disclosure is generally related to computer systems, and is more specifically related to cryptographic data processing systems and methods.

BACKGROUND

Since the advent of computers, systems and methods for safeguarding cryptographic keys and/or other sensitive data have been constantly evolving. Also systems and methods for gaining unauthorized access to the protected data, ranging from conceptually unsophisticated brute force password cracking to complex external monitoring attacks, have also been evolving. The performance of a cryptographic operation by an integrated circuit may result in the susceptibility of the integrated circuit to a side channel attack where an attacker of the integrated circuit may obtain secret information as the cryptographic operation is performed. An example of a side channel attack includes, but is not limited to, Differential Power Analysis (DPA) where the attacker, who seeks to obtain a secret key or other such secret information used in the cryptographic operation, may study the differences in power consumption of the integrated circuit as the cryptographic operation is performed. Such an attacker may be an unauthorized entity that may obtain information of the cryptographic operation by analyzing power consumption measurements of the integrated circuit over a period of time. Accordingly, when the cryptographic operation is performed, the attacker may be able to retrieve secret information (e.g., a secret key) that is used during the cryptographic operation. The cryptographic community has typically viewed the implementation of countermeasures to side channel analysis as a task that requires extensive use of assembly languages.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
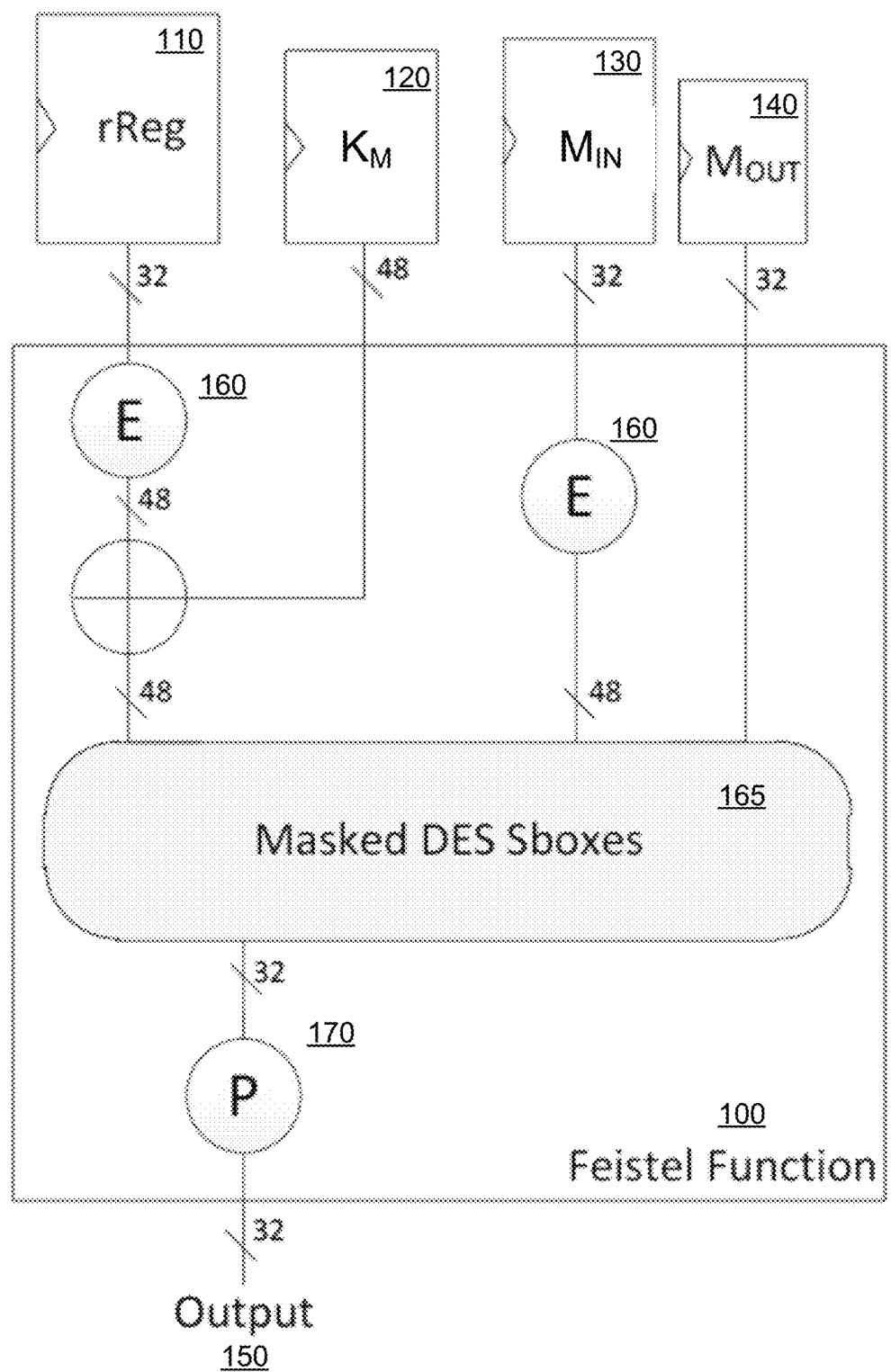
FIG. 1 schematically illustrates a block diagram of an example masked Feistel structure according to one implementation.

Described herein are systems and methods for protecting cryptographic data processing operations, such as block cipher computation operations, from external monitoring attacks. As described above, the cryptographic community has typically viewed the implementation of countermeasures to side channel analysis as a task that requires extensive use of assembly languages. The embodiments described herein provide a solution that takes a higher-level software implementation of the Data Encryption Standard (DES) and produces a side channel resistant solution, even when compiler optimizations are used. An example apparatus for implementing a block cipher may comprise a memory device to store instructions for computing a block cipher and a processing device coupled to the memory device. The processing device performs the DES cryptographic operation with multiple rounds of a Feistel structure, each round including a substitution function and a transformation function that combines an expansion function and a permutation function into a single operation. The transformation function transforms a first input portion of an internal state of the respective round and a second input portion of the internal state into a first output portion and a second output portion of data. The second output portion is equal to the first input portion and the first output portion is dependent on a combined permutation output from the transformation function.

"Cryptographic data processing operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, a cryptographic hardware accelerator, or the like) configured or employed for performing cryptographic data processing operations.

"Block cipher" herein shall refer to a cryptographic method which processes blocks of plaintext of a certain size in order to produce the corresponding ciphertext and/or blocks of ciphertext to produce the corresponding plaintext. "External monitoring attack" herein shall refer to a method of gaining unauthorized access to protected information by deriving one or more protected information items from certain aspects of the physical implementation and/or operation of the target cryptographic data processing device. Side channel attacks are external monitoring attacks that are based on measuring values of one or more physical parameters associated with operations of the target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing device. The attacker may apply DPA methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations.

Protecting cryptographic operations from external monitoring attacks may involve employing variable masking schemes. In an illustrative example, the external monitoring attack countermeasures may include applying a randomly generated integer mask to a secret value by performing the bitwise exclusive disjunction operation. In order to mask a secret value S, a mask M is applied to it by the exclusive disjunction operation; to remove the mask, the exclusive disjunction is performed on the masked secret value and the mask. In more complex scenarios, e.g., in which a masked value is processed by a non-linear operation, the mask correction value (i.e., the value that is employed to remove a previously applied mask) may differ from the mask.

However, implementing a masking scheme may not be sufficient for protecting certain multi-round cryptographic operations from round leakage, which may be caused by correlations of intermediate values that are processed by adjacent rounds. In an illustrative example, a block cipher may be provided by the Triple Data Encryption Algorithm (TDEA). TDEA is based on the Data Encryption Algorithm (DEA) cryptographic engine.

The DEA cryptographic engine may be employed to cryptographically protect (e.g., encrypt) 64-bit data blocks of data using a 64-bit key. Subsequent processing of the protected data (e.g., decryption) is accomplished using the same key as was used to protect the data. The DEA engine subjects an input data block to an initial permutation, then to multiple rounds of complex key-dependent computations that employ substitution tables (also referenced herein as "S-boxes"), and finally to a permutation that is the inverse of the initial permutation, as described in more detail herein below.

The present disclosure introduces systems and methods for protecting cryptographic data processing operations, such as block cipher computation operations, from external monitoring attacks, by utilizing a higher-level software implementation of the DES that produces a side channel resistant solution, even when compiler optimizations are used. For example, a C implementation of DES can be used in which, for each round, the expansion permutation and the P-permutation of the DES is combined into one function that transforms a 32-bit output of the S-box (e.g., S-box look-up) to a 48-bit word. Each round transforms two 48-bit words, where the output is two 48-bit words. One of the two 48-bit words is equal to one of the input words and the other is dependent on the combined permutation. In some implementations, the DES can include eight look-up tables of eight 6-bit words. The tables can be masked with random values (e.g., XOR'ed with 48-bit random words). In other implementations, the random values can be modified such that the output mask of each round is the same as the input. In another implementation, an output of the transformation function is the XOR sum of the eight look-up tables. The systems and methods described herein can minimize round leakage and other correlations in the block cipher data path and are applicable to a wide range of block cipher implementations that utilize masked S-boxes. Thus, the systems and methods described herein represent improvements to the functionality of general purpose or specialized computing devices, by enabling performance of cryptographic data processing operations in a manner resistant to external monitoring attacks.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, the bus width values referenced in the accompanying description are for illustrative purposes only and do not limit the scope of the present disclosure to any particular bus width values.

In various illustrative examples described herein below, cryptographic data processing devices may be configured or employed for implementing TDEA cryptographic operations. However, the systems and methods described herein for performing cryptographic data processing operations in a manner resistant to external monitoring attacks may be applicable to various other cryptographic data processing methods.

As noted herein above, the DEA engine subjects an input data block to an initial permutation, then to multiple rounds of complex key-dependent computations, and finally to a permutation that is the inverse of the initial permutation. DEA forward transformation may be described as follows:

$$L_n = R_{n-1}$$

$$R_n = L_n - 1 \oplus (R_{n-1}, K_n),$$

where n is the number of the round in the range from 1 to 16;

$L_n$ and $R_n$ are left (uppermost) and right (lowermost) bit strings of the permuted input block such that their concatenation produces the round state: $RS_n = cat(L_n, R_n)$;

$K_n$ is the round key; and

F is the Feistel function; and $\oplus$ represents the exclusive disjunction (XOR) operation (i.e. bitwise modulo 2 addition of bit sequences of equal size).

DEA inverse transformation may be described as follows:

$$R_{n-1} = L_n$$

$$L_{n-1} = R_n \oplus F(L_n, K_n),$$

where $R_{16}L_{16}$ is the permuted input block for the inverse transformation.

The Feistel function (denoted as F) utilizes a 48-bit key to processes a 32-bit input data block through multiple parallel substitution tables (also referred to as "S-boxes") in order to produce a 32-bit output data block. An S-box may be represented by a rectangular table that produces an m-bit output corresponding to an n-bit input. An S-box may be implemented as a static table or may by dynamically generated on-the-fly.

TDEA forward cipher operation involves three consecutive DEA operations using a key bundle comprising three keys:

$$\text{Output} = Enc_{Key3}(Dec_{Key2}(Enc_{key1}(d))),$$

where $Enc_{Keyx}(d)$ and $Dec_{Keyx}(d)$ represent the forward and reverse DEA transformations, respectively.

TDEA reverse cipher operation also involves three consecutive DEA operations:

$$\text{Output} = Dec_{Key1}(Enc_{Key2}(Dec_{key3}(d))).$$

In various illustrative examples, protecting DEA implementations from external monitoring attacks may involve masking the round input state using an input mask, utilizing masked S-boxes for computing a masked transformation output corresponding to the masked input state, and unmasking the masked transformation output using a mask correction value. FIG. 1 schematically illustrates a block diagram of an example masked Feistel function implementation.

FIG. 1 schematically illustrates a block diagram of an example masked Feistel structure according to one implementation. As schematically illustrated by FIG. 1, the Feistel function may be implemented by the example non-linear transformation circuit 100 which receives 32-bit input data masked with the input mask $M_{IN}$ from rReg register 110, a 48-bit round key (K) 120, a 32-bit input mask (M) 130, and a 32-bit output mask ($M_{OUT}$) 140. The input and output masks $M_{IN}$ and $M_{OUT}$ are utilized for pre-computing the masked S-boxes that operate in parallel to implement the non-linear transformation 165. In certain implementations, the input and output masks $M_{IN}$ and $M_{OUT}$ may be changed for every TDEA operation, thus causing re-computation of the corresponding S-boxes. In certain implementations, the input and output masks $M_{IN}$ and $M_{OUT}$ may have the same values.

The non-linear transformation circuit 100 applies the expansion function 160 to the masked round input value stored in the register 110, performs a non-linear transformation 165 of the combination of the masked key KM stored in the register 120 with the output of the expansion function 160, and applies the permutation function 170 to the output of the non-linear transformation 165. Therefore, the Feistel function output 150 may be defined as follows:

$$\text{Output} = P(S_M(E(rReg) \oplus K_M)) = P(S(E(X) \oplus K) \oplus M_{OUT}),$$

where E represents the expansion function 160 that expands 32-bit input into 48-bit output, by duplicating certain bits, e.g., according to a pre-defined bit selection table;

$S_M$ represents one or more of pre-computed masked S boxes, such that each S-box accepts an input value $P(X \oplus M_{IN})$ and produces the output value $Y = P(S(E(X) \oplus K_M)$ masked with the output mask $M_{OUT}$;

S represents one or more S-boxes such that each S-box produces a 32-bit output corresponding to a 48-bit input value;

P represents the permutation function 170 that yields a 32-bit output from a 32-bit input by permuting the bits of the input block e.g., according to a pre-defined permutation table; and $rReg = X \oplus M_{IN}$.

Figure 2:
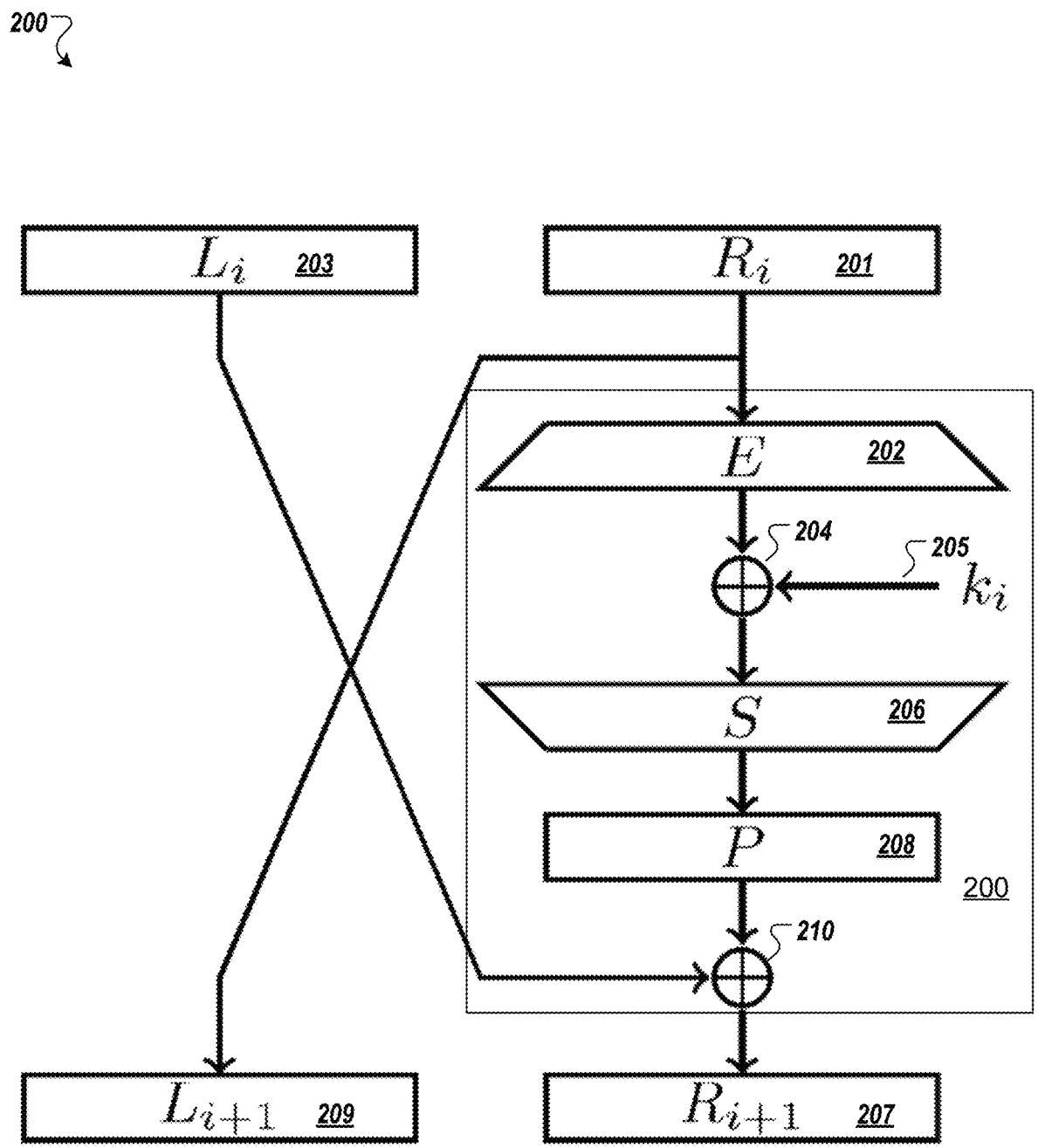
FIG. 2 is a block diagram of a Feistel structure of FIG. 1 according to one implementation.

FIG. 2 is a block diagram of a Feistel structure 100 of FIG. 1 according to one implementation. A DES cryptographic operation includes 16 rounds of a Feistel structure 200 as shown in FIG. 2. The Feistel structure 200 is similar to the Feistel structure 100 of FIG. 1, except where expressly noted. The input of each round is two 32-bit words $\{L_i, R_i\}$ 201, 203, for $i \in \{1, \ldots, 16\}$, and outputs two 32-bit words $\{L_{i+1}, R_{i+1}\}$ 207, 209. In the round function, the function E is referred to as the expansion function 202 that transforms a 32-bit word in a 48-bit word, which is then XOR'ed 204 with a subkey 205 for a given round (k ≠). The subkey 205 can be a subset of bits from a 56-bit secret key. The substitute function S 206 is a series of look-ups using eight 6-bit words each on a different look-up table, producing eight 4-bit words. The function P is the so-called P-permutation 208, a bitwise permutation providing diffusion in the block cipher. The following provide the definition of the functions E, S, and P:

$$E: \mathbb{F}_2^{32} \to \mathbb{F}_2^{48} : x \mapsto y \text{ with } y_i = x_{e_i}, \forall i \in \{1, \ldots, 48\}$$

$$S: \mathbb{F}_2^{48} \to \mathbb{F}_2^{32} : x = \{x_1 \| \ldots \| x_8\} \mapsto [S_1(x_1) \| \ldots \| S_8(x_8)]$$

$$\text{with } S_i: \mathbb{F}_2^6 \to \mathbb{F}_2^4 : x \mapsto y, \forall i \in \{1, \ldots, 8\}$$

$$\text{with } y_j : s_j(x)_j \forall i \in \{1, \ldots, 8\}, \forall j \in \{1, \ldots, 4\}$$

$$P: \mathbb{F}_2^{32} \to \mathbb{F}_2^{32} : x \mapsto y \text{ with } y_i = x_{p_i}, \forall i \in \{1, \ldots, 32\}$$

The e and p list the bitwise map for the expansion function 202 and P-permutation 208 respectively, and s is one of the eight substitution tables of the substitute function S 206. Bold symbols represent vectors, regular symbols represent bits. It should also be noted that there is a bitwise permutation at the beginning and a bitwise permutation at the end of the block cipher, included as the most convenient way to get bits in and out of the original hardware implementation. These two permutations do not contribute to the security of the block cipher and can be implemented in C without any risk of causing key related leakage. One way to implement a bitwise permutation in C would be to repeatedly read a byte, perform a logical-AND operation to extract one bit and to write the result to a target byte. However, there is nothing to stop a compiler from replacing this operation with tests on individual bits and conditionally writing an output bit, especially as commands that do precisely this are available in many instruction sets. This could result in a trivial attack where individual bits being permuted can be read by inspecting a power/EM consumption trace.

Figure 3:
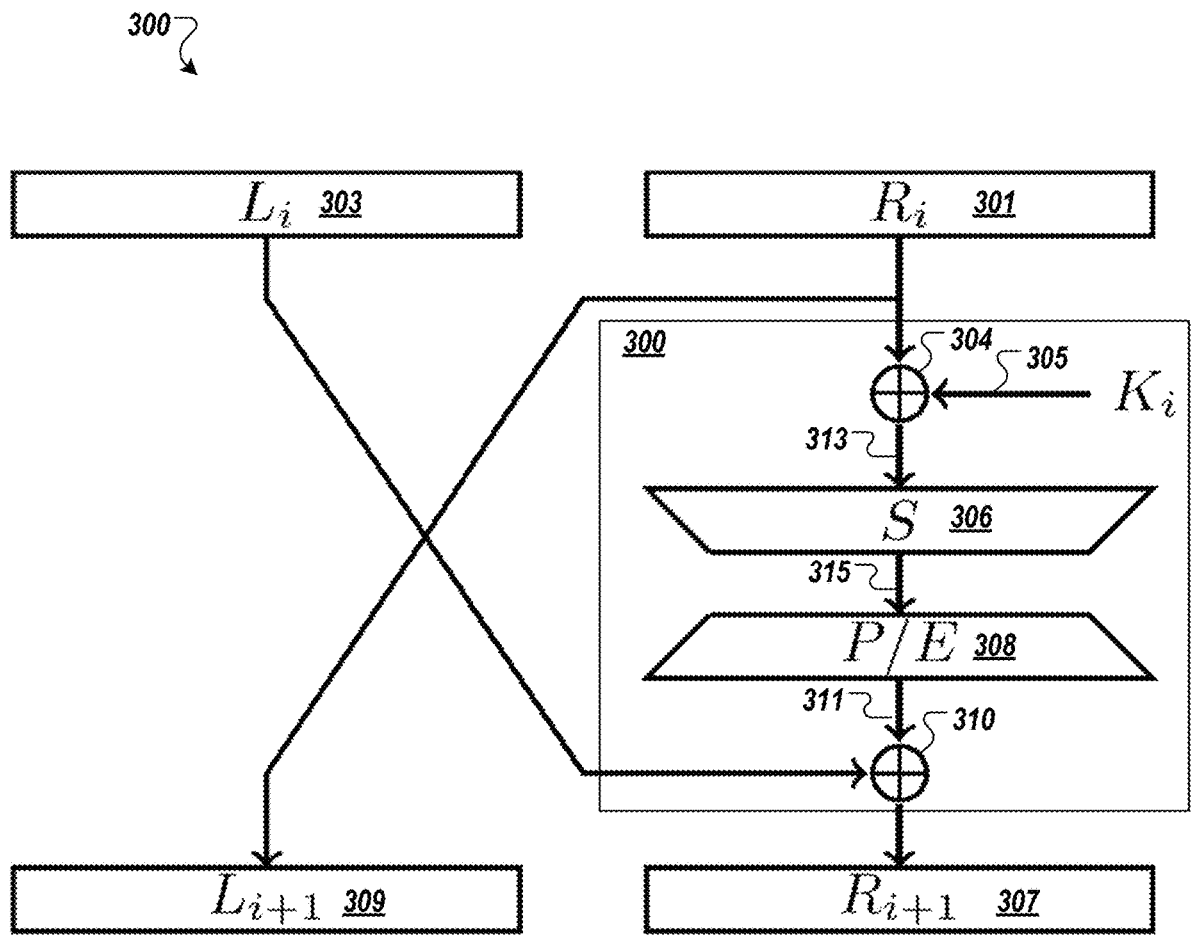
FIG. 3 is a block diagram of a Feistel structure with a transformation function that combines an expansion function and a permutation function into a single operation in a platform neutral DES cryptographic operation, in accordance with one or more aspects of the present disclosure.

To minimize the number of bitwise permutations conducted on intermediate states that could potentially be attacked, aspects of the present disclosure modify the DES round function as follows: The input of each round can be changed to be two 48-bit words $\{L_i, R_i\}$, for $i \in \{1, \ldots, 16\}$, that outputs two 48-bit words $\{L_{i+1}, R_{i+1}\}$. This can be achieved by combining the initial permutation with two instances of the expansion permutation, one for $L_1$ and one for $R_1$, and the final permutation can be adjusted to produce the correct result. The only remaining permutation is the P-permutation that can be changed to also conduct an expansion permutation as one single operation. This gives the Feistel structure as shown in FIG. 3. As described below with respect to FIG. 3-4, aspects of the present disclosure can avoid bitwise operations or reduce bitwise operations and can implement the Feistel structure in higher-level software (e.g., C). Because the bitwise permutations are combined with other functions, these modified DES round function (e.g., modified Feistel structures) prevent the complier from replacing these bitwise permutations with tests on individual bits and conditionally writing an output bit and prevents the complier from replacing these bitwise permutations with other commands in the instruction sets. It should be noted that the Triple-DES is used in the banking industry and side-channel resistant implementations are still required in these application. The following describes a side-channel resistant implementation of DES as Triple-DES is still relevant, and the bitwise permutations require a particular treatment so that a compiler cannot change the code that implements DES.

FIG. 3 is a block diagram of a Feistel structure 300 with a transformation function 308 that combines an expansion function and a permutation function into a single operation (also referred to as transformation function P/E 308 in a platform neutral DES cryptographic operation, in accordance with one or more aspects of the present disclosure. In performing a DES cryptographic operation, each of the multiple rounds uses the Feistel structure 300 in which a substitution function S 306 and the transformation function P/E 308 are performed. As described herein, the transformation function P/E 308 combines an expansion function and a permutation function into a single operation. The transformation function P/E 308 transforms a first input portion 301 of an internal state of the respective round into a first output portion 307. A second output portion 309 is equal to the first input portion 301 and the first output portion 307 is dependent on a combined permutation output 311 from the transformation function P/E 308.

During each round, the first input portion 301 ($R_i$) can be a first 48-bit input word and the second input portion 303 ($L_i$) can be a second 48-bit input word. The first output portion 307 ($R_{i+1}$) can be a first 48-bit output word and the second output portion 301 ($L_{i+1}$) can be a second 48-bit output word. With the first input portion 301 being 48-bit input word, the first input portion 301 can be XOR'ed 304 with the secret key 305 that can also be 48-bits. An output value 313 of the XOR function 304 can be an input into the substitution function S 306. An output of the substitution function S 306 can be an input to the transformation function P/E 308. The combined permutation output 311 can be XOR'ed 310 with the second input portion 303 and an output of the XOR 310 function is the first output portion 307. During the respective round, the first input portion 301 becomes the second output portion 309.

The transformation function P/E 308 can be implemented with eight look-up tables of eight 6-bit words. As such, the single operation is a single look-up operation on the eight look-up tables. The eight look-up tables can be loaded into a cache of a processing device prior to a first round of the multiple rounds. In another embodiment, the eight look-up tables are stored in non-volatile memory and loaded into a cache of the processing device prior to a first round of the multiple rounds. In one embodiment, a side-channel resistant instance of the substitute function $S_i$ 306 can be implemented as a randomized table. Similarly, the transformation function P/E 308, which combines the P and the expansion permutations as described herein, can be implemented as a randomized table. In another embodiment, the values of the eight look-up tables are masked with random values. The random values can be such that an output mask of each of the multiple rounds is the same as an input mask of each of the multiple rounds.

For example, a table for each 4-bit output of the substitution function S 306, referred to as one S-box, can be created, where each entry is 48 bits (or rather eight 6-bit words) where the bits affected by the 4-bit output of the S-box are set to one. That is, the transformation function P/E 308 can be defined as follows:

$$P/E: \mathbb{F}_2^{32} \to \mathbb{F}_2^{48}: x \mapsto y, \text{ with } y_i = x_{eP_i} \forall i \in \{1, \ldots, 48\}$$

This function can be further modified to be more efficient. For example, the transformation function P/E 308 can be defined as follows:

$$P/E: \mathbb{F}_2^{32} \to \mathbb{F}_2^{48}: x = \{x_1 \| \ldots \| x_8\} \mapsto [P/E_1(x_1) \oplus \ldots \oplus P/E_8(x_8)]$$

with $P/E_i: \mathbb{F}_2^4 \to \mathbb{F}_2^{48}: x \mapsto y, \forall i \in \{1, \ldots, 8\}$ with $y_j : p_{e_j}4(k-1), \forall k \in \{1, \ldots, 8\}, \forall i \in \{1, \ldots, 4\}$,
$\forall j \in \{1, \ldots, 48\}$ The XOR sum of the result of $P/E_k$ for $k \in \{1, \ldots, 8\}$, i.e. $\oplus_{k=1}^{8} P/E_k$, will give the result of the transformation function P/E 308. Each instance of the transformation function P/E 308, referred to as $P/E_k$ function, can be implemented as a table with 16 entries. The result of each $P/E_k$ function will be 48 bits (eight 6-bit words) that will, for convenience, need to be stored in 8-bit words. Hence, the transformation function P/E 308 computes using eight tables of 27 bytes, requiring a total of 210 bytes. These tables would need to be implemented as a randomized table.

Assuming that each $\{L_i, R_i\}$, for $i \in \{1, \ldots, 16\}$, is masked using an XOR with the same pair of 48-bit masks $\{M_L, M_R\}$ then the construction of tables for substitution function S 306 will have to align with $M_R$, and any effect from XOR'ing with a subkey. Likewise, the construction of tables for the functions $P/E_k$, for $k \in \{1, \ldots, 8\}$, will align with the masks used to randomize the entries of the table used to compute the substitution function S 306. The tables used to compute $P/E_k$, for $k \in \{1, \ldots, 8\}$ can be implemented using a different 48-bit mask for each k, i.e. $M_{pe,k}$, $k \in \{1, \ldots, 8\}$. Then, the value (expressed in the following equation) can be used to remove the mask from $P/E_k$, for $k \in \{1, \ldots, 8\}$, and the XOR with left-hand 48-bit word; then replace the mask with $M_R$ for the next round:

$$M_S = M_L \oplus M_R \oplus \bigoplus_{k=1}^{8} M_{pe,k}$$

The above will provide first-order side-channel resistance to the round function, but there can be potential problems with the key schedule. The subkey that is used can be masked using some XOR mask, $M_{K,i}$, for $i \in \{1, \ldots, 16\}$. If a 56-bit mask is applied to the secret key, the same key schedule functions can be applied to the mask and the masked key to give $\{K_i, M_{K,i}\}$, for $i \in \{1, \ldots, 16\}$, such as illustrated and described below with respect to FIG. 4. However, as with the permutations in the round function, a straightforward implementation of the bitwise permutation could leak bits of the key if an attacker inspects a power consumption/EM trace. There are two permutations, referred to as PC1 and PC2, and a bitwise rotation used in DES as part of the key schedule.

$PC1: \mathbb{F}_2^{56} \to \mathbb{F}_2^{56}: x \mapsto y$, with $y_i = x_{g_i}, \forall i \in \{1, \ldots, 48\}$ $PC2: \mathbb{F}_2^{56} \to \mathbb{F}_2^{48}: x \mapsto y$, with $y_i = x_{h_i}, \forall i \in \{1, \ldots, 48\}$ where g and h list the bitwise map for the PC1 and PC2 permutations. The function PC1 can be put into a table in the same way used for the transformation function P/E 308 described above. The most-significant seven bits of each byte of the secret key can be split into a 4-bit and a 3-bit value used to look up a 56-bit result. The XOR sum of which provides the permuted secret key. This requires 211 bytes (e.g., 8×24×7+8×23×7~211 bytes). Likewise, the same method can be applied to the PC2 permutation requiring a further 211 bytes (e.g., 14×16×8~211 bytes). However, given that the same treatment can be independently applied to both the mask and the masked key, these bytes can be stored in non-volatile memory and would have little impact on performance. If the implementation is to be run on a microprocessor with a cache then these tables can be moved into RAM and given a mask. It should be noted that one does not need to keep the masks that are applied to these functions, as the same mask will affect both the masked key and its mask.

As described above, the Feistel structure 300 and other operations described above can be implemented in higher-level software that provides a side channel resistant solution, even when compiler optimizations are used. Each round of the Feistel structure 300, the substitution function 306 and the transformation function 308 are performed. The transformation function 308 combines the explanation function and the permutations function into a single operation. The transformation function 308 transforms a first input portion 301 of an internal state of the respective round and a second input portion 303 of the internal state into a first output portion 307 and a second output portion 309 of data. The second output portion 309 is equal to the first input portion 301 and the first output portion 307 is dependent on a combined permutation output from the transformation function 308.

In a further embodiment, the first input portion 301 is a first 48-bit input word and the second input portion 303 is a second 48-bit input word. The first output portion 307 is a first 48-bit output word and the second output portion 309 is a second 48-bit output word. Alternatively, other number of bits can be used for the input and output portions. In a further embodiment, the transformation function 308 uses eight look-up tables of eight 6-bit words and the single operation is a single look-up operation. The eight look-up tables can be loaded into a cache prior to a first round. For example, the eight look-up tables are stored in non-volatile memory and loaded into a cache prior to the first round. The values of the eight look-up tables can be masked with random values. In other embodiments, the random values are such that an output mask of each of the rounds is the same as an input mask of each of the rounds.

In one embodiment, the values of the eight look-up tables are masked by performing an exclusive-OR (XOR) operation with each value and a 48-bit random value. In another embodiment, the combined permutation output from the transformation function 308 is an XOR sum of an output of the eight look-up tables.

In one embodiment, each of the plurality of rounds further includes an expansion function to modify the internal state of the DES cryptographic operation from two 32-bit words to the first 48-bit input word (e.g., 301) and the second 48-bit input word (e.g., 303). In a further embodiment, the first 48-bit input word and the second 48-bit input word are each masked with a 48-bit random value.

In one embodiment, the first input portion 301 and the second input portion 303 of the internal state of the respective round is derived from an input value. The input value can a 64-bit value and expansion functions can be used to obtain the 48-bit input word of the first input portion 301 and the 48-bit input word of the second input portion 303. For example, in one embodiment, each of the rounds further includes a first expansion function that receives a first portion of the input value and expands the first portion into the first input portion 301 and a second expansion function that receives a second portion of the input value and expands the second portion into the second input portion 303. The input value is a 64-bit value is fed into the first expansion function and the second expansion function, resulting in the first input portion 301 being a 48-bit word and the second input portion 303 is being 48-bit word.

As illustrated in FIG. 3, each of the rounds can include the XOR function 304 that receives the first input portion 301 and the secret key 305 and outputs an output value 313 to the substitution function 306. Alternatively, as shown and described below with respect to FIG. 4, each of the rounds can include a first XOR function that receives the first input portion and a secret key and outputs a first output value and a second XOR function that receives the first output value and a masked key and outputs a second output value to the substitution function. In one embodiment, the secret key 305 is masked with a mask to obtain a masked key. The masked key and the mask can be used to generate subkeys independently from the transformation function.

Figure 4:
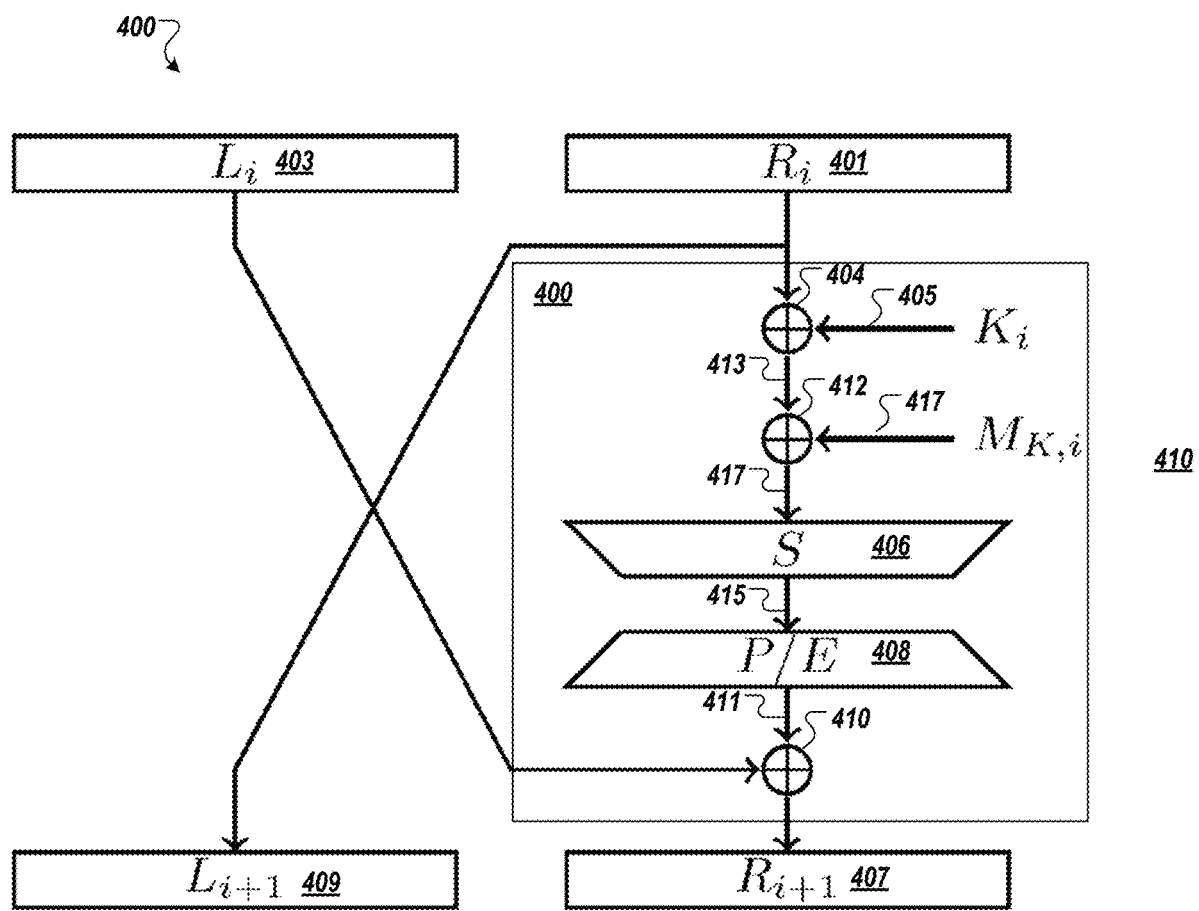
FIG. 4 is a block diagram of another Feistel structure with a transformation function and a masked key schedule in a platform neutral DES cryptographic operation, in accordance with one or more aspects of the present disclosure.

FIG. 4 is a block diagram of another Feistel structure 400 with a transformation function 408 and a masked key schedule in a platform neutral DES cryptographic operation, in accordance with one or more aspects of the present disclosure. In performing a DES cryptographic operation, each of the multiple rounds uses the Feistel structure 400 in which a substitution function 406 and the transformation function P/E 408 are performed. The substitution function 406 and the transformation function P/E 408 are similar to the substitution function S 306 and the transformation function P/E 308 described above. The transformation function P/E 408 combines an expansion function and a permutation function into a single operation. The substitution function 406 and transformation function P/E 408 transforms a first input portion 401 of an internal state of the respective round into a first output portion 407. A second output portion 409 is equal to the first input portion 401 and the first output portion 407 is dependent on a combined permutation output 411 from the transformation function P/E 408.

During each round, the first input portion 401 ($R_i$) can be a first 48-bit input word and the second input portion 403 ($L_i$) can be a second 48-bit input word. The first output portion 407 ($R_{i+1}$) can be a first 48-bit output word and the second output portion 409 ($L_{i+1}$) can be a second 48-bit output word. With the first input portion 401 being 48-bit input word, the first input portion 401 can be XOR'ed 404 with the secret key 405 that can also be 48-bits. An output value 413 of the XOR function 404 can be XOR'ed 412 with a masked key 417 that can also be 48-bits. An output 417 of the XOR function 412 can be an input of the substitution function S 406. An output of the substitution function S 306 can be an input to the transformation function P/E 408. The combined permutation output 411 can be XOR'ed 410 with the second input portion 403 and an output of the XOR 410 function is the first output portion 407. During the respective round, the first input portion 401 becomes the second output portion 409.

Similar to the transformation function P/E 308, the transformation function P/E 408 can be implemented with eight look-up tables of eight 6-bit words. The eight look-up tables can be loaded into a cache of a processing device prior to a first round of the multiple rounds. In another embodiment, the eight look-up tables are stored in non-volatile memory and loaded into a cache of the processing device prior to a first round of the multiple rounds. In one embodiment, a side-channel resistant instance of the substitute function $S_i$ 406 can be implemented as a randomized table. Similarly, the transformation function P/E 408, which combines the P permutation and the expansion permutation as described herein, can be implemented as a randomized table. In another embodiment, the values of the eight look-up tables are masked with random values. The random values can be such that an output mask of each of the multiple rounds is the same as an input mask of each of the multiple rounds.

As described above, each of the rounds can include the first XOR function 404 that receives the first input portion 401 and the secret key 405 and outputs the output value 413 and a second XOR function 412 that receives the output value 413 and a masked key 417 and outputs a second output value 417 to the substitution function 406. In one embodiment, the secret key 405 is masked with a mask to obtain a masked key. The masked key and the mask can be used to generate subkeys independently from the transformation function 408.

In one embodiment, the secret key is masked and the masked key and mask are used to generate subkeys as bitwise permutations. In one embodiment, the subkeys can be generated using tables, such as eight look-up tables of eight 6-bit words. A portion of the masked key and the mask can be used as the index for the table. In another embodiment, the round includes a function that uses eight look-up tables of eight 6-bit words with a portion of the secret key. The values of the eight look-up tables can be masked by performing an XOR operation with each value and a 48-bit random value. The eight look-up tables can be stored in a non-volatile memory and loaded into a cache prior to the first round.

In one embodiment, the first input portion 401 and the second input portion 403 of the internal state of the respective round is derived from an input value. The input value can be a 64-bit value and the expansion functions can be used to obtain the 48-bit word of the first input portion 401 and the 48-bit word of the second input portion 403. For example, in one embodiment, each of the rounds further includes a first expansion function that receives a first portion of the input value and expands the first portion into the first input portion 401 and a second expansion function that receives a second portion of the input value and expands the second portion into the second input portion 403. The input value is a 64-bit value is fed into the first expansion function and the second expansion function, resulting in the first input portion 401 being a 48-bit word and the second input portion 403 is being 48-bit word.

In another embodiment, an integrated circuit includes a cache and a processing device coupled to the cache. The cache can store a look-up tables for a transformation function of a block cipher. The processing logic performs a DES cryptographic operation, including a plurality of rounds of a Feistel structure. Each of the plurality of rounds includes a substitution function and the transformation function that combines an expansion function and a permutation function into a single operation. The transformation function transforms a first input portion of an internal state of the respective round and a second input portion of the internal state into a first output portion and a second output portion of data. The second output portion is equal to the first input portion and the first output portion is dependent on a combined permutation output from the transformation function. In a further embodiment, each of the plurality of rounds further includes: a first expansion function to expand a first portion of an input value into the first input portion, wherein the first input portion is 48-bits and the input value is 64-bits; a second expansion function to expand a second portion of the input value into the second input portion, wherein the second input portion is 48-bits; a first exclusive-OR (XOR) function that receives the first input portion and a secret key and outputs a first value that is input into the substitution function, wherein an output of the substitution function is input into the transformation function; and a second XOR function that receives an output of the transformation function and the second input portion and outputs the first output portion. In one embodiment, the DES cryptographic operation is part of Triple Data Encryption Algorithm (TDEA) process that protects against external monitoring attacks.

In another embodiment, an apparatus implements a block cipher. The apparatus includes a first register to store a first input portion of an internal state of a respective round of a plurality of rounds of a Feistel structure; a second register to store a second input portion of the internal state of the respective round; a third register to store a secret key; a fourth register to store the first output portion; and a fifth register to store a second output portion of the internal state of the respective round, and a transformation circuit is configured to apply a first exclusive-OR (XOR) function to the first input portion and the secret key to obtain a first value. The transformation circuit is configured to apply a substitution function to the first value to obtain a second value and apply the transformation function to the second value to transform the second value into a third value. The transformation function combines an expansion function and a permutation function into a single operation. The transformation circuit is configured to apply a second XOR function to the third value and the second input portion to obtain a first output portion of the internal state of the respective round. The second output portion is equal to the first input portion and the first output portion is dependent on a combined permutation output from the transformation function. In a further embodiment, the apparatus includes a cache to store a plurality of tables for the transformation function. In such cases, the single operation can be a single look-up operation in the plurality of tables.

In another embodiment, an apparatus includes a first register to store a first input portion of an internal state of a respective round of a plurality of rounds of a Feistel structure; a second register to store a second input portion of the internal state of the respective round; a third register to store a secret key; a fourth register to store a masked key; a fifth register to store the first output portion, a sixth register to store a second output portion of the internal state of the respective round, and a transformation circuit. The transformation circuit is configured to: apply a first exclusive-OR (XOR) function to the first input portion and the secret key to obtain a first value; apply a second XOR function to the first value and the masked key to obtain a second value; apply a substitution function to the second value to obtain a third value; apply the transformation function to the third value to transform the third value into a fourth value, wherein the transformation function combines an expansion function and a permutation function into a single operation; and apply a second XOR function to the fourth value and the second input portion to obtain a first output portion of the internal state of the respective round. The first output portion is dependent on a combined permutation output from the transformation function and the second output portion is equal to the first input portion. The apparatus can further include a cache to store a plurality of tables for the transformation function. In such cases, the single operation can be a single look-up operation in the plurality of tables. The bitwise rotations, described herein, can also be implemented using table look-ups. However, in this case, only small tables are required to replace the bit shifts by one. This is summarized in the algorithm, illustrated in FIG. 5.

Figure 5:
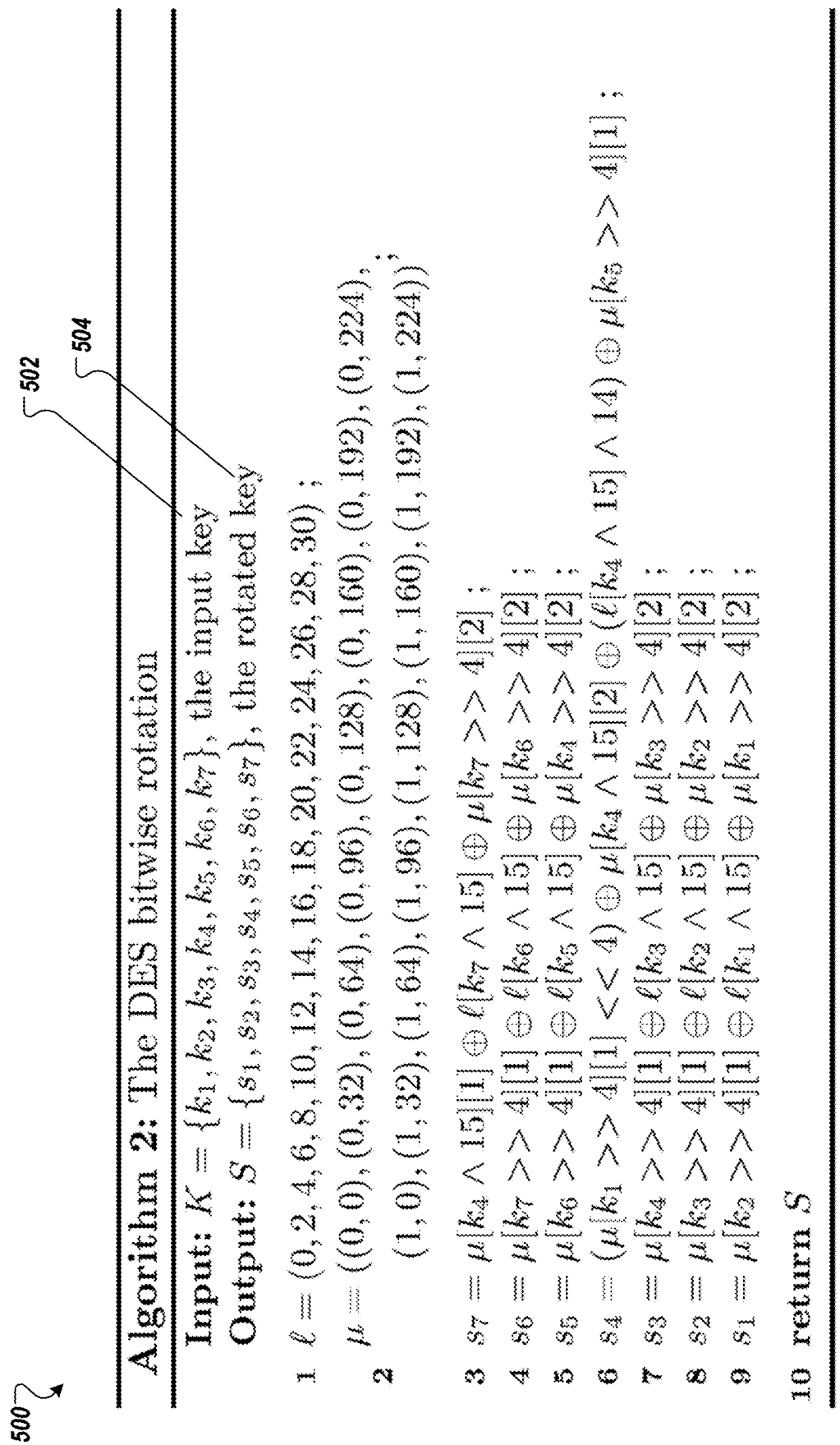
FIG. 5 illustrates an algorithm where a key stored on seven bytes is rotated according to one embodiment.

FIG. 5 illustrates an algorithm 500 where a key stored on seven bytes is rotated according to one embodiment. In the algorithm 500, an input key 502 is rotated into a rotated key 504 using the rotated scheme set forth in the DES bitwise rotation.

The round structured described herein can simplify bitwise permutations of the DES by changing $\{L_i, R_i\}$ to 48-bit words (using the bitwise permutation), stored as eight 6-bit numbers and then the round function can be defined as set forth in FIGS. 4-5, where the substitution function remains the same and the transformation function combines the two bitwise permutations to transform eight 4-bit words to eight 6-bit words. The transformation function can be randomized as one would normally do for a Boolean masked implementation. The transformation function can also be put in tables and randomized in a similar manner. The values in $\{L_i, R_i\}$ can be masked using two different 48-bit words and the masks in the transformation function are chosen such that the same mask is applied to $R_i$, and the mask applied to $L_i$, can be modified using the XOR sum of the two masks. To protect the subkeys, the secret key can be Boolean masked and the key schedule can be applied to each mask changing the round function, such as illustrated in FIG. 4.

It should be noted that the two shares of the subkey can be eight 6-bit words. The operations used to generate the subkeys are bitwise operations that can be implemented as look-up tables. In a device without a cache these look-up tables can be stored in non-volatile memory as the tables are only applied to shares of the secret key. In a device with a cache the tables need to read into cache before they are used. Typically, by reading every $x^{th}$ table element and the first and last element, where x is equal to or less than the cache line size. It should also be noted that look-up tables are required as implementing a bitwise permutation may result in compiled code that has an SPA leak, where an attacker can deduce the two shares of the secret key.

The functions described herein can be used in connection with a TDEA implementation, a masked TDEA implementation, or the like. The input data blocks can be stored in input registers and a random number generator can be used to seed masks stored in masked registers. The masks stored in the mask registers can be swapped after completing each DEA round, e.g., according to a mask swapping schedule). For example, the values of mask registers are initially stored and utilized in the first DEA round and, in a second round, the values are swapped, and the one value can be combined with a combined permuted output mask from the transformation function. In a third round, the values can be swapped again and the other value is combined with a combined permuted output mask from the transformation function, and so forth. At every round, the value stored in the one mask register can be fed as the input to the Feistel structure (e.g., 300, 400) and the output can be stored in an output register. In certain implementations, an optional register pipe stage can be added on the Feistel function output to reduce or prevent jitter effects and thus increase DPA resistance. After the completion of the final round, the resulting round state is unmasked by the concatenation of the mask values, which are stored in the respective registers. These values can be subjected to a final permutation.

In accordance with one or more aspects of this disclosure, the above described and other implementations of block cipher computation operations may also be protected from external monitoring attacks by utilizing pre-computed mask values for the linear part of the data path in order to avoid simultaneous manipulation on masks and masked values. These pre-computed mask values may be stored in registers and may not be manipulated during round computations. Furthermore, possible correlations may be reduced by register pre-charging, i.e., overwriting the registers with random values before loading any values into the registers. The systems and methods described herein can minimize round leakage and other correlations in the linear path of the block cipher data path and are applicable to a wide range of block cipher implementations that utilize masked S-boxes.

As explained in more detail herein, the Feistel function may be implemented by a non-linear transformation circuit that utilizes one or more parallel masked S-boxes to perform a combined permutation function and explanation function as a single non-linear transformation, instead of applying the expansion function to a portion of the masked round state, utilizing one or more parallel masked S-boxes to perform a non-linear transformation of the combination of the masked key with the output of the expansion function, and then applying the permutation function to the S-box output. The S-boxes may be pre-computed using the input mask value stored in one register and the output mask value stored in another register. For each round, the expansion permutation and the P-permutations is combined into one function, transforming 32-bit output of the S-box look-up to a 48-bit word. Each round transforms two 48-bit words, where the output is two 48-bit words. One of the output words is equal to one of the input words and the other is dependent on the combined permutation. In one implementation, eight look-up tables of eight 6-bit words can be used. The tables can be masked with random values, such as being XOR'ed with 48-bit random words. The random values can even be modified such that the output mask of each round is the same as the input. In another implementation, the result can be the XOR sum of the eight look-up tables. In another implementation, the internal state of the DES can be modified to be two 48-bit words, rather than two 32-bit words, resulting in eight 6-bit words each. The 48-bit words can be masked with random values, such as XOR'ed with 48-bit random words. In another implementation, the secret key is masked and the masked key and the mask are used to generate subkeys independently of the bitwise permutations. In one implementation, tables can be used to generate the subkeys. Also, the masked subkey and the mask can be applied to the round function separately, as described herein. Also, as described herein, the tables can be preloaded into cache, where appropriate. In another implementation, the initial permutation with the two instances of the expansion permutations can be combined to produce two 48-bit words from the 64-bit input.

Figure 6:
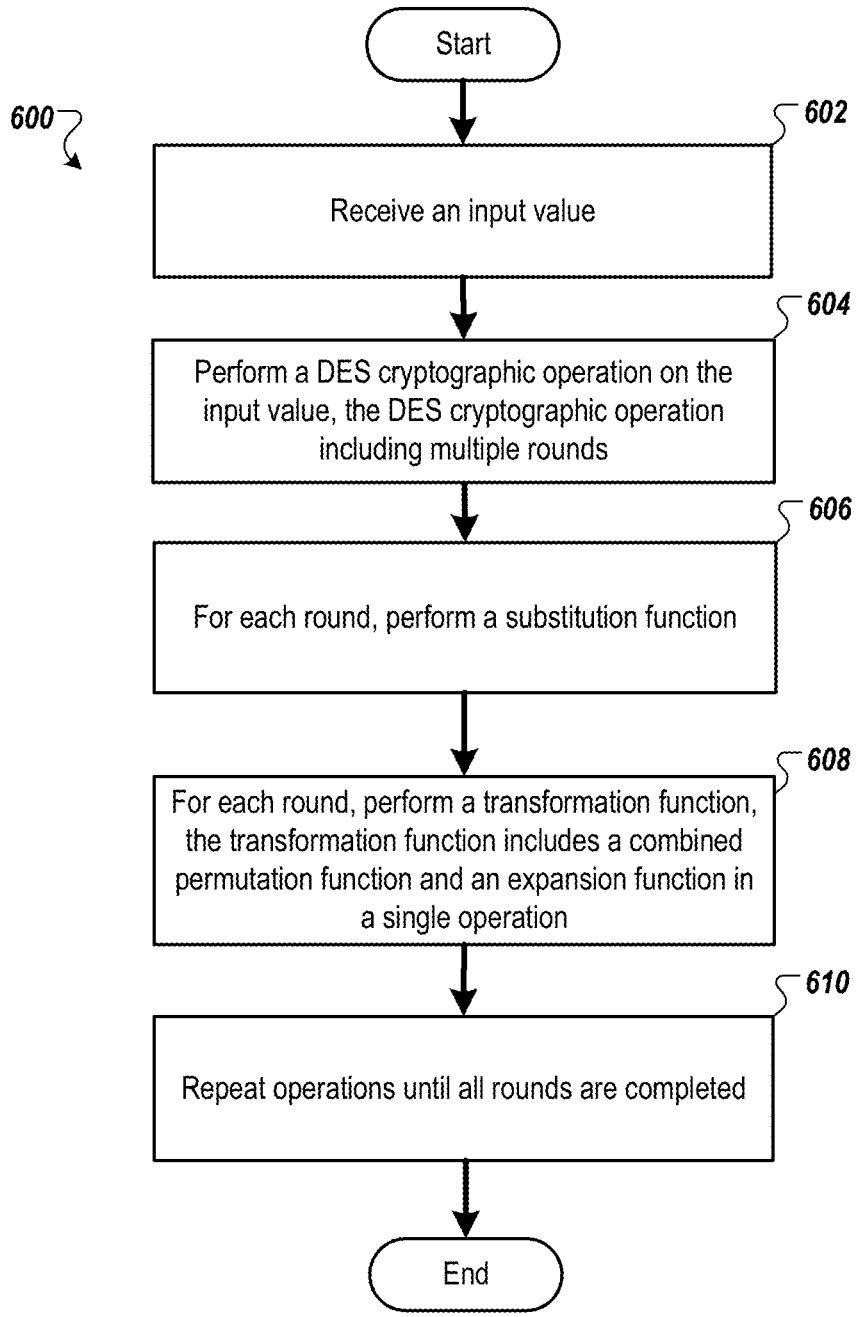
FIG. 6 is a flow diagram of a method of operating a platform neutral DES cryptographic function according to one embodiment.

FIG. 6 is a flow diagram of a method 600 of operating a platform neutral DES cryptographic function according to one embodiment. The method 600 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by a processing device, such as the processing device 702 of FIG. 7.

Referring to FIG. 6, at block 602, the processing logic begins by receiving an input value. The processing logic performs DES cryptographic operation (block 604). The DES cryptographic operation includes multiple rounds of a Feistel structure. In each round, the processing logic performs a substitution function on a first input portion of an internal state of the respective round (block 606). The processing logic performs a transformation function on the first input portion into a first output portion (block 608). The transformation function combines an expansion function and a permutation function into a single operation. The first output portion is dependent on a combined permutation output from the transformation function and a second output portion of data is equal to a second input portion of the internal state of the respective round. The processing logic repeats the operations of blocks 606 and 608 for each round (block 610), and the method 600 ends.

In a further embodiment, the input value is 64-bits each of the rounds includes expanding a first portion of the input value into the first input portion and expanding a second portion of the input value into the second input portion. The first input portion is 32-bits and the first expanded input portion is 48-bits and the second input portion is 32-bits and the second expanded input portion is 48-bits. In a further embodiment, the processing logic performs a first XOR operation on the first input portion and a secret key to obtain a first value that is input into the substitution function. An output of the substitution function is input into the transformation function. The processing logic performs a second XOR operation on an output of the transformation function and the second input portion to obtain the first output portion. In a further embodiment, the processing logic performs the transformation function on the first portion by performing a single look-up operation in eight look-up tables of eight 6-bit words. The processing logic can load the eight look-up tables into a cache prior to a first round. Each of the rounds can also perform an XOR operation with the first input portion and a secret key to obtain a first output value that is input into to the substitution function.

In another embodiment, each of the rounds includes performing a first XOR operation with the first input portion and a secret key to obtain a first output value and performing a second XOR operation with the first output value and a masked key to obtain a second output value that is input into to the substitution function.

Figure 7:
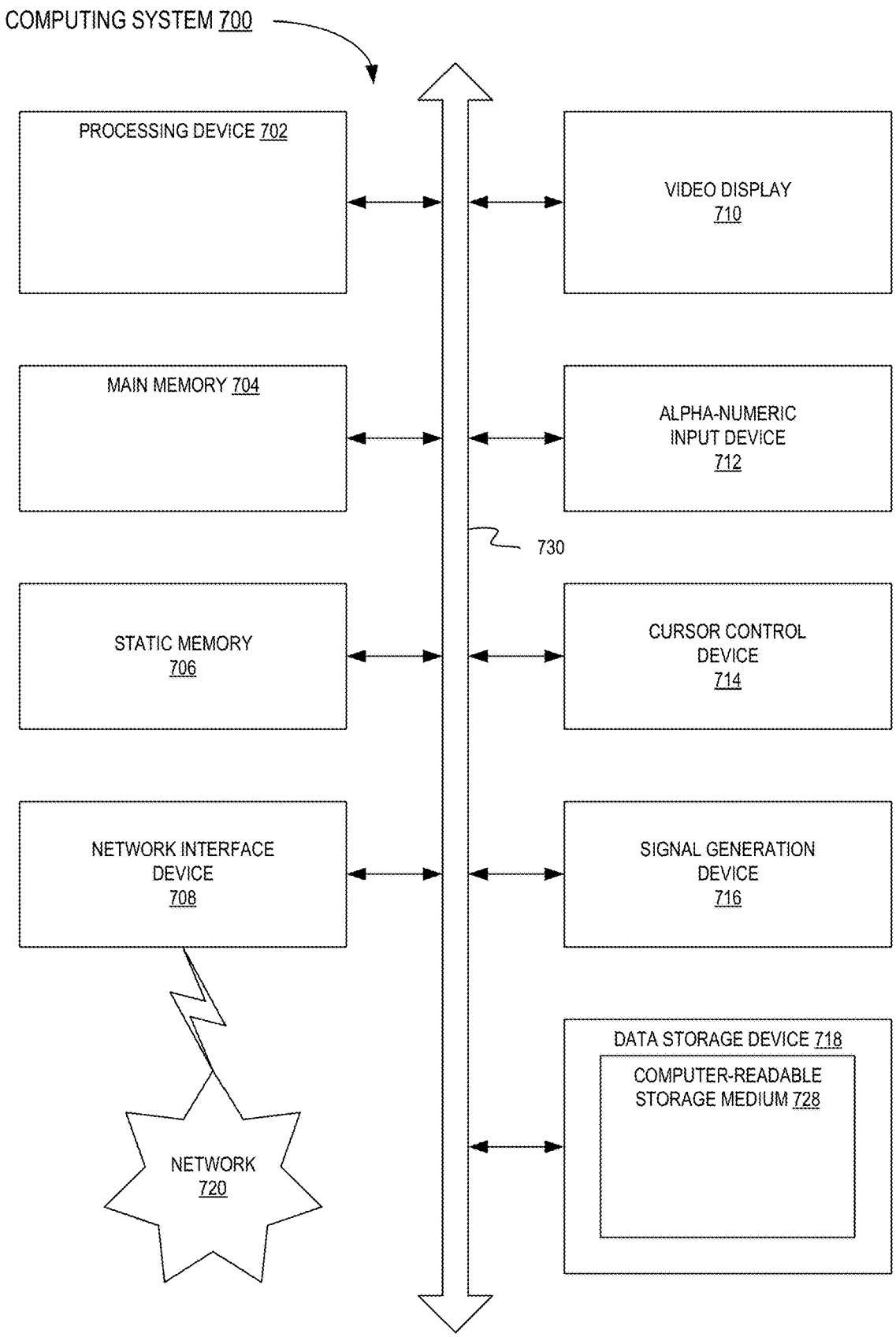
FIG. 7 illustrates a diagrammatic representation of a computing system which may incorporate the example operations and cryptographic data processing devices described herein.

FIG. 7 illustrates a diagrammatic representation of a computing system 700 which may incorporate the example operations and cryptographic data processing devices described herein. Computing system 700 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 700 may include a processing device 702, which in various illustrative examples may be a general purpose or specialized processor comprising one or more processing cores. The example computing system 700 may further comprise a main memory 704 (e.g., synchronous dynamic random access memory (DRAM), read-only memory (ROM)), a static memory 706 (e.g., flash memory and a data storage device 718), which may communicate with each other via a bus 730.

The example computing system 700 may further include a network interface device 708 which may communicate with a network 720. The example computing system 700 also may include a video display unit 710 (e.g., a liquid crystal display (LCD) or a cathode ray tube (CRT)), an alphanumeric input device 712 (e.g., a keyboard), a cursor control device 707 (e.g., a mouse) and an acoustic signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable storage medium 728 on which may be stored one or more sets of instructions implementing any one or more of the methods or functions described herein. The instructions may also reside, completely or at least partially, within the main memory 704 and/or within the processing device 702 during execution thereof by the example computing system 700, hence the main memory 704 and the processing device 702 may also constitute or comprise computer-readable media. The instructions may further be transmitted or received over the network 720 via the network interface device 708.

While the computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "performing", "expanding", "determining", "sending", "receiving", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A computing device comprising:
a memory device to store instructions for computing a block cipher; and
a processing device coupled to the memory device, wherein the instructions, when executed by the processing device, perform a Data Encryption Standard (DES) cryptographic operation comprising a plurality of rounds of a Feistel structure, each of the plurality of rounds comprising a substitution function and a transformation function that combines an expansion function and a permutation function into a single operation, wherein the transformation function transforms a first input portion of an internal state of the respective round and a second input portion of the internal state into a first output portion and a second output portion of data, wherein the second output portion is equal to the first input portion and the first output portion is dependent on a combined permutation output from the transformation function, wherein the transformation function uses look-up tables, wherein values of the look-up tables are masked with random values, and wherein the random values are such that an output mask of each of the plurality of rounds is the same as an input mask of each of the plurality of rounds.

2. The computing device of claim 1, wherein the first input portion is a first 48-bit input word and the second input portion is a second 48-bit input word, wherein the first output portion is a first 48-bit output word and the second output portion is a second 48-bit output word.

3. The computing device of claim 2, wherein the look-up tables comprises eight look-up tables of eight 6-bit words, and wherein the single operation is a single look-up operation.

4. The computing device of claim 3, wherein the eight look-up tables are loaded into a cache of the processing device prior to a first round of the plurality of rounds.

5. The computing device of claim 3, wherein the eight look-up tables are stored in non-volatile memory and loaded into a cache of the processing device prior to a first round of the plurality of rounds.

6. The computing device of claim 3, wherein values of the eight look-up tables are masked by performing an exclusive-OR (XOR) operation with each value and a 48-bit random value.

7. The computing device of claim 3, wherein the combined permutation output from the transformation function is an exclusive-OR (XOR) sum of an output of the eight look-up tables.

8. The computing device of claim 2, wherein each of the plurality of rounds further comprises an expansion function to modify an internal state of the DES cryptographic operation from two 32-bit words to the first 48-bit input word and the second 48-bit input word, and wherein the first 48-bit input word and the second 48-bit input word are each masked with a 48-bit random value.

9. The computing device of claim 1, wherein each of the plurality of rounds further comprises an XOR function that receives the first input portion and a secret key and outputs a first output value to the substitution function.

10. The computing device of claim 1, wherein each of the plurality of rounds further comprises:
a first XOR function that receives the first input portion and a secret key and outputs a first output value; and
a second XOR function that receives the first output value and a masked key and outputs a second output value to the substitution function, wherein the secret key is masked with a mask to obtain a masked key, and wherein the masked key and the mask generate subkeys independently from the transformation function.

11. The computing device of claim 10, wherein the look-up tables comprises eight look-up tables to store the subkeys, wherein the eight look-up tables are stored in a non-volatile memory and loaded into a cache of the processing device prior to a first round of the plurality of rounds.

12. The computing device of claim 1, wherein each of the plurality of rounds further comprises:
a first expansion function that receives a first portion of an input value and expands the first portion into the first input portion; and
a second expansion function that receives a second portion of the input value and expands the second portion into the second input portion, wherein the input value is a 64-bit value, and wherein the first input portion is a 48-bit word and the second input portion is a 48-bit word.

13. A method comprising:
receiving, by a processing device, an input value; and
performing, by the processing device, a Data Encryption Standard (DES) cryptographic operation comprising a plurality of rounds of a Feistel structure, wherein each of the plurality of rounds, comprises:
performing a substitution function on a first input portion of an internal state of the respective round; and
performing a transformation function on the first input portion into a first output portion, wherein the transformation function combines an expansion function and a permutation function into a single operation, wherein the first output portion is dependent on a combined permutation output from the transformation function, wherein a second input portion of the internal state and a second output portion of data is equal to a second input portion of the internal state of the respective round, wherein performing the transformation function on the first input portion comprises performing a look-up operation in look-up tables, wherein values of the look-up tables are masked with random values, and wherein the random values are such that an output mask of each of the plurality of rounds is the same as an input mask of each of the plurality of rounds.

14. The method of claim 13, wherein the input value is 64-bits, wherein each of the plurality of rounds further comprises:
expanding a first portion of the input value into the first input portion, wherein the first portion of the input value is 32-bits and the first input portion is 48-bits;
expanding a second portion of the input value into the second input portion, wherein the second portion of the input value is 32-bits and the second input portion is 48-bits;
performing a first exclusive-OR (XOR) operation on the first input portion and a secret key to obtain a first value that is input into the substitution function, wherein an output of the substitution function is input into the transformation function; and
performing a second XOR operation on an output of the transformation function and the second input portion to obtain the first output portion.

15. The method of claim 14, wherein the look-up tables comprises eight look-up tables of eight 6-bit words, wherein performing the look-up operation comprises performing a single look-up operation in the eight look-up tables of the eight 6-bit words, and wherein the method further comprises loading the eight look-up tables into a cache prior to a first round of the plurality of rounds.

16. The method of claim 13, wherein each of the plurality of rounds further comprises performing an XOR operation with the first input portion and a secret key to obtain a first output value that is input into the substitution function.

17. The method of claim 13, wherein each of the plurality of rounds further comprises:
performing a first XOR operation with the first input portion and a secret key to obtain a first output value; and
performing a second XOR operation with the first output value and a masked key to obtain a second output value that is input into the substitution function.

18. An integrated circuit comprising:
a cache to store a look-up tables for a transformation function of a block cipher, wherein values of the look-up tables are masked with random values; and
a processing device coupled to the cache, the processing device to perform a Data Encryption Standard (DES) cryptographic operation comprising a plurality of rounds of a Feistel structure, each of the plurality of rounds comprising a substitution function and the transformation function that combines an expansion function and a permutation function into a single operation, wherein the transformation function transforms a first input portion of an internal state of the respective round and a second input portion of the internal state into a first output portion and a second output portion of data, wherein the second output portion is equal to the first input portion and the first output portion is dependent on a combined permutation output from the transformation function, wherein the transformation function uses the look-up tables, and wherein the random values are such that an output mask of each of the plurality of rounds is the same as an input mask of each of the plurality of rounds.

19. The integrated circuit of claim 18, wherein each of the plurality of rounds further comprises:
a first expansion function to expand a first portion of an input value into the first input portion, wherein the first input portion is 48-bits and the input value is 64-bits;
a second expansion function to expand a second portion of the input value into the second input portion, wherein the second input portion is 48-bits;
a first exclusive-OR (XOR) function that receives the first input portion and a secret key and outputs a first value that is input into the substitution function, wherein an output of the substitution function is input into the transformation function; and
a second XOR function that receives an output of the transformation function and the second input portion and outputs the first output portion, wherein the DES cryptographic operation is part of a Triple Data Encryption Algorithm (TDEA) process that protects against external monitoring attacks.

\* \* \* \* \*